(12) United States Patent
Kabbabe Malave et al.

(10) Patent No.: US 10,465,146 B2
(45) Date of Patent: Nov. 5, 2019

(54) CLEANING AGENT FOR CLEANING POLYMER PROCESSING EQUIPMENT, METHOD FOR PRODUCING IT AND ITS USE

(71) Applicant: SOLVAY SA, Brussels (BE)

(72) Inventors: Jorge Alejandro Kabbabe Malave, Bourg-la-Reine (FR); Karine Cavalier, Uccle (BE); Jean-Yves Seguin, Rosieres aux Salines (FR)

(73) Assignee: Solvay SA, Brussels (BE)

( * ) Notice: Subject to any disclaimer, the term of this patent is extended or adjusted under 35 U.S.C. 154(b) by 70 days.

(21) Appl. No.: 15/795,771

(22) Filed: Oct. 27, 2017

(65) Prior Publication Data

US 2018/0119054 A1 May 3, 2018

Related U.S. Application Data

(60) Provisional application No. 62/415,024, filed on Oct. 31, 2016.

(30) Foreign Application Priority Data

Dec. 14, 2016 (EP) .................................... 16204055

(51) Int. Cl.
*B08B 9/00* (2006.01)
*C11D 3/10* (2006.01)
*C11D 3/37* (2006.01)

(52) U.S. Cl.
CPC .............. *C11D 3/10* (2013.01); *C11D 3/3749* (2013.01)

(58) Field of Classification Search
CPC .. B08B 9/00; B08B 9/02; B08B 9/027; B08B 9/032
USPC ......................................................... 134/22.1
See application file for complete search history.

(56) References Cited

U.S. PATENT DOCUMENTS

| | | | |
|---|---|---|---|
| 2002/0193267 A1* | 12/2002 | Nitzsche | ................. B29C 48/04 510/188 |
| 2010/0175720 A1 | 7/2010 | Ito et al. | |
| 2011/0012275 A1* | 1/2011 | Shida | ...................... B29C 48/27 264/39 |

FOREIGN PATENT DOCUMENTS

| | | |
|---|---|---|
| JP | H09208754 A | 8/1997 |
| JP | H1081898 A | 3/1998 |
| JP | 2002003666 A | 1/2002 |
| JP | 2011246609 A | 12/2011 |

* cited by examiner

*Primary Examiner* — Gregory E Webb
(74) *Attorney, Agent, or Firm* — Beatrice C. Ortego

(57) ABSTRACT

A cleaning agent for cleaning polymer processing equipment, a method for producing such cleaning agent and the use of such cleaning agent for cleaning polymer processing equipment or any component thereof. The cleaning agent comprises i) a thermoplastic resin and ii) a foaming agent selected from alkali metal and ammonium bicarbonates.

15 Claims, No Drawings

CLEANING AGENT FOR CLEANING POLYMER PROCESSING EQUIPMENT, METHOD FOR PRODUCING IT AND ITS USE

CROSS-REFERENCE TO RELATED APPLICATIONS

The present application claims priority to U.S. provisional application No. 62/415,024 filed on Oct. 31, 2016 and to the European application No. 16204055.4 filed on Dec. 14, 2016, the content of each of these applications being incorporated herein by reference.

TECHNICAL FIELD OF THE INVENTION

The present invention relates to a cleaning agent for cleaning polymer processing equipment, a method for producing such cleaning agent and the use of such cleaning agent for cleaning polymer processing equipment or any component thereof.

BACKGROUND

Thermoplastic or thermosetting polymeric material or resin is typically processed in processing equipment, such as injection molders or extruders. The polymer materials typically introduced or fed into the processing equipment are in a granular or pellet form which is subsequently heated above its melting point and formed into a final product. As known in the art, the polymeric materials can be colored with pigments or other colorants in order to provide the final product with a desired appearance.

The manufacturers and processors frequently need to change the kinds and colors of resin in a single processing equipment in accordance with the market needs. Such changes in the kinds and colors of resin result in a waste of time and materials and correspondingly, there has been desired the development of a method for effective cleaning of the interior of polymer processing equipment, such as the molding machine, in order to improve production efficacy and quality of the resulting products.

Furthermore, the processing of polymers and particularly polymers that are polar and/or have an affinity to metal surfaces when melted, can result in build-up of the polymer in the polymer processing equipment (e.g., on a screw or barrel, such as on an extruder, or in a dye, an adapter, or other component of the processing equipment). The build-up of polymer, over time, may result in polymer being exposed to heat for an extended period of time, such that some of the polymer changes in color or flow characteristics. As a consequence, a part being produced using a process that includes a step of processing the polymer through the processing equipment may be discolored, have non-uniform color (e.g., black specks) or have defects resulting from the change in flow characteristics. As one example, polymer that has been exposed to heat for an extended time may result in particles that block the flow of material, such as through a die.

Various methods are known in the art to clean the polymer processing equipment after running a processing resin, so that the equipment does not need to be dismantled and manually cleaned. The cleaning may be done with a neat resin or with another processing resin to be processed into parts. Cleaning agents are commercially available and are routinely employed to remove certain processing resins. Cleaning agents also find utility when transition between processing of a first processing resin to a second processing resin. Cleaning agents disclosed in the prior art include those that employ abrasives (US 2002/0193267) or a chain scission catalyst (US 2011/0012275) which renders the cleaning agent reactive and facilitates the removing of residual polymer from the processing equipment. Further cleaning agents are for example known from JP 2011-246609, JP H1081898, JP H09208754 and JP 2002-003666.

Despite the advances in cleaning agents, there continues to be a need for new cleaning agents that can remove a broad range of polymers, such that the number of different cleaning agents needed by a polymer processor is reduced.

There is also a continued need for cleaning agents that clean more efficiently such that the amount of unproductive time on the processing equipment is reduced, the amount of waste generated during the cleaning is minimized, or both.

SUMMARY

The present inventors now found that one or more of the above needs may be met with a cleaning agent which comprises a thermoplastic resin and a foaming agent selected from the group consisting of alkali metal and ammonium bicarbonates.

The present invention therefore relates to a cleaning agent for cleaning polymer processing equipment, wherein the cleaning agent comprises
i) a thermoplastic resin and
ii) a foaming agent selected from the group consisting of alkali metal and ammonium bicarbonates.

It was surprisingly found that, if the cleaning agent comprises a foaming agent selected from the group consisting of alkali metal and ammonium bicarbonates in addition to the thermoplastic resin, an improved cleaning efficacy is achieved without the requirement of any additional agent being effective in cleaning the polymer processing equipment, such as an abrasive agent or a chain scission catalyst. This has the advantage that the cleaning agent needs less components and therefore is less expensive and that there is no risk that the polymer processing equipment might be damaged by any abrasive agent being present in the cleaning agent.

DETAILED DESCRIPTION

The term "polymer processing equipment" is used, in the present invention, in its broad meanings including injection molding machines, extruders, blow molding machines, sheet extruders, pipe extruders, foam molding machines, inflation molding machines and other machines for molding or processing resins, or any components or parts thereof.

The thermoplastic resin in the cleaning agent of the present invention can be any thermoplastic resin known to a person skilled in the art. Suitable thermoplastic resins are for example those having a peak melting temperature or a glass transition temperature greater than about 50° C., preferably greater than about 80° C., and more preferably greater than about 100° C. (as measured according to ASTM D3418-97). The resin may have a glass transition temperature, a peak melting temperature, or both, that is less than about 260° C., preferably less than about 200° C., and more preferably less than about 180° C.

Without limitation, suitable thermoplastic resins for use in the cleaning agent include polyvinylchlorides, polyamides, polyacrylates, polystyrols, polyethylene terephthalates, polybutylene terephthalate, polymethyl methacrylates, and polyolefins, in particular olefin containing in polymers and styrene containing polymers.

For example, the thermoplastic resin may include, consist essentially of, or consist entirely of one or more polyolefin polymers, such as one or more polyolefin homopolymers (e.g., polyethylene homopolymers, polypropylene homopolymers, or both), one or more copolymers including at least 50% by weight (preferably at least 60% by weight) of a first α-olefin (e.g., ethylene or propylene) based on the total weight of the polyolefin polymer, or any combination thereof.

Without limitation, exemplary styrene-containing polymers and α-olefin-containing polymers that may be employed in the cleaning agent include polyethylenes, such as polyethylene homopolymers; polyethylene copolymers including at least one additional α-olefin such as propylene, 1-butene, 1-hexene, 1-octene, 1-decene, or any combination thereof (e.g., high-density polyethylene, medium-density polyethylene, low-density polyethylene, linear low-density polyethylene, very low density polyethylene, and ultralow density polyethylene); copolymers of ethylene with a second monomer selected, e.g., from the group consisting of vinyl actetate, and acrylate ester, styrene, 4-methyl-1-pentene, and any combinations thereof (e.g., ethylene vinyl acetate copolymer, ethylene butyl acrylate copolymer, ethylene methyl acrylate copolymer, and ethylene styrene copolymer); polypropylene homopolymers, propylene copolymers including at least one additional monomer selected from the group consisting of ethylene, 1-butene, 1-hexene-1-octene, 1-decene, 4-methyl-1-pentene, and any combination thereof (such as isotactic polypropylene, syndiotactic polypropylene, impact polypropylene, and random polypropylene); poly-1-butene; poly-4-methyl-1-pentene; styrene-containing polymers including polystyrene homopolymer, impact modified polystyrene, polystyrene random copolymers, polystyrene block copolymers (such as styrene-butadiene copolymers, acrylonitrile-butadiene-styrene block copolymers, styrene-butadiene-styrene block copolymers, styrene-isoprene-styrene block copolymers, and partially or fully hydrogenate analogous of any of the above); or any combination thereof. Copolymers (e.g., random copolymers or graft copolymers of any of the above polymers with an unsaturated carboxylic acid, an acid anhydride of an unsaturated carboxylic acid, a vinyl silane compound, and epoxide, or any combination thereof, may also be employed.

The thermoplastic resin preferably includes, consists essentially of, or consists entirely of a high-density polyethylene, a low-density polyethylene, random polypropylene copolymer (e.g., including ethylene), and impact polypropylene, or any combination thereof. More preferably, the thermoplastic resin includes, consists substantially of, or consists entirely of high-density polyethylene (HDPE). Most preferably, the thermoplastic resin is HDPE.

The foaming agent used in the cleaning agent of the present invention may preferably be selected from the group consisting of sodium bicarbonate, potassium bicarbonate, sodium sesquicarbonate and potassium sesquicarbonate, sodium bicarbonate being most preferred.

In one embodiment, the foaming agent and in particular the sodium bicarbonate is not coated.

In another embodiment, the foaming agent is coated with one or more further additives. Such coating can protect the foaming agent from early decomposition and/or improve the coating agent's capabilities in terms of dispersion in the polymer matrix. Suitable coating agents are for example alkali metal carbonates, such as sodium carbonate and potassium carbonate, fatty acids, such as stearic acid, and fatty acid salts, such as calcium or magnesium stearate. Those binding agents, which will be described in more detail below, are also suitable for coating the foaming agent.

The amount of foaming agent in the cleaning agent is not particularly limited. However, the amount should be high enough to increase the resin displacement and cleaning efficacy of the thermoplastic resin. On the other hand, it was found that, if the amount of foaming agent in the cleaning agent is high, the viscosity of the molten cleaning agent increases and can reach an undesired extent. Therefore, it is preferred that the cleaning agent comprises at least 0.1, preferably at least 0.5, more preferably at least 1, even more preferably at least 2, at least 3 or at least 4% by weight of the foaming agent based on the total weight of the cleaning agent. In a particularly preferred embodiment, the cleaning agent comprises more than 5% by weight, even more preferably more than 6% by weight or more than 7% by weight of the foaming agent based on the total weight of the cleaning agent. The cleaning agent may comprise up to 40% by weight of the foaming agent, more preferably up to 35% by weight, even more preferably up to 30% by weight, even more preferably up to 25% by weight, even more preferably up to 15% by weight and most preferably up to 10% by weight of the foaming agent, based on the total weight of the cleaning agent. Any of these lower limits may be combined with any of these upper limits to preferred ranges of the amount of foaming agent in the cleaning agent.

In one embodiment, the cleaning agent comprises 0.1 to 40% by weight of the foaming agent, preferably 0.5 to 35% by weight and even more preferably 1 to 30% by weight of the foaming agent based on the total weight of the cleaning agent. In certain embodiments, the cleaning agent may comprise 1 to 15% by weight, preferably more than 5 to 15% by weight of the foaming agent based on the total weight of the cleaning agent.

The foaming agent may be present in the cleaning agent in the form of particles, such as in the form of a plurality of pellets, granules, rods, powder or other particles.

The average particle size of the foaming agent particles is not particularly limited and can be selected by the skilled person according to the requirements. Suitably, the foaming agent particles have an average particle size in the range of 0.1 to 4 mm, preferably in the range of 1 to 4 mm, more preferably in the range of 1.5 to 3.5 mm. Smaller and larger particles, in particular smaller particles are suitable as well.

The cleaning agent can be a mixture comprising particles of the thermoplastic resin and particles of the foaming agent. In this case, the particles of thermoplastic resin can also be in the form of a plurality of pellets, granules, rods, powder, or other particles. Preferably, in such mixture, the average particle size of the foaming agent particles and the average particle size of the thermoplastic resin particles are within the same range.

The cleaning agent may comprise one or more further components either within the thermoplastic resin particles, within the foaming agent particles or as discrete additional particles.

In a preferred embodiment, the cleaning agent is a mixture of sodium bicarbonate granules and thermoplastic resin granules, in particular a mixture of sodium bicarbonate granules and HDPE granules, more preferably a mixture of sodium bicarbonate granules having an average particle size in the range of 1.5 to 3.5 mm and HDPE granules, most preferably a mixture of sodium bicarbonate granules having an average particle size in the range of 1.5 to 3.5 mm and HDPE granules having a particle size in the range of 1.5 to 3.5 mm.

In an alternative embodiment, the cleaning agent according to the invention is in the form of particles comprising the thermoplastic resin and the foaming agent. In this case, the cleaning agent is in the form of a plurality of pellets, granules, rods, powder or other particles. The thermoplastic resin and the foaming agent are, however, not within different particles but the cleaning agent comprises particles which comprise both, the thermoplastic resin and the foaming agent. For example, the foaming agent may be dispersed within the thermoplastic resin.

If the cleaning agent is in the form of particles comprising the thermoplastic resin and the foaming agent, the cleaning agent may additionally comprise particles of thermoplastic resin which do not comprise any foaming agent, particles of foaming agent which do not comprise any thermoplastic resin and/or particles comprising further additives as explained below.

In each of the above embodiments the cleaning agent may comprise one or more thermoplastic resins and one or more foaming agents which may be present in the same or different particles.

The cleaning agent of the present invention may comprise one or more further additives. Such additives may be selected from fillers and/or known functional additives, such as selected from the group consisting of binding agents that bind together the foaming agent with the thermoplastic resin, stabilizers, processing aids, anti-blocking agents, anti-static agents, antioxidants, lubricants, pigments, surfactants, plasticizers, and any combination thereof. Each of these additional additives may be present in an amount which will not adversely affect the effects of the cleaning agent.

For example, the cleaning agent according to the invention may further include one or more additional additives that are known in the art to promote the resin displacement and cleaning of polymer processing equipment (including but not limited to abrasive inorganic powders or other abrasive inorganic materials such as silica, titanium dioxide, calcium carbonate, and mixtures thereof, additional foaming agents, surfactants, plasticizers, or any combination thereof). However, in a preferred embodiment, the cleaning agent of the invention does not contain any abrasive agent or chain scission catalyst, in particular those abrasive agents and catalysts disclosed in US 2002/0193267 and US 2011/0012275, the contents of both documents are incorporated herewith by reference.

In one preferred embodiment, the cleaning agent further comprises at least one binding agent that binds together foaming with the thermoplastic resin. In this context "binds together" means that the binding agent facilitates either the mixture of thermoplastic resin particles with foaming agent particles or, preferably, facilitates the dispersion of the foaming agent within thermoplastic resin particles. Suitable binding agents are for example amide wax, maleated ethylene way, maleated propylene wax, microcrystalline wax, oxidized wax, paraffin wax, petroleum wax, polyethylene wax, such as LDPE, PTFE wax, wax ester, wax soap, such as stearate salts, and in particular calcium or magnesium stearate, polycaprolactone wax, glycol wax, or any combination thereof.

The cleaning agent of the invention may also include a surfactant component. Surfactants are generally used in the agent to de-dust and/or densify. Examples of surfactants include, but are not limited to mineral oil, castor oil, and soy bean oil. The surfactants can be either in solid or liquid form.

The cleaning agent of the invention may be produced by mixing particles of the thermoplastic resin with particles of the foaming agent to obtain an admixture (e.g., a generally homogenous admixture). As such, the components may be mixed with usual mixing equipment, such as an equipment that provides shear, a mill, and the like.

Alternatively, the cleaning agent may be produced by compounding the thermoplastic resin with the foaming agent to obtain particles comprising the thermoplastic resin and the foaming agent. In this embodiment, the components may for example be mixed using usual polymer processing equipment that provides heat, shear, or both, such as an internal mixture, a single screw extruder, a twin screw extruder, a mill, and the like. In one embodiment, the compounding is conducted by hot or cold compression molding, such as melt extrusion.

Further additives as described above may be added either to the mixture of particles of the thermoplastic resin and particles of the foaming agent or to the particles comprising the thermoplastic resin and the foaming agent. In case that the thermoplastic resin is compounded with the foaming agent, any further additive may be added prior to or after the compounding step.

The cleaning agent of the present invention may be used for cleaning polymer processing equipment or any component thereof. In this context, "cleaning" includes the at least partial removal of impurities, such as polymers or other materials, from the polymer processing equipment or any component thereof. For example, such cleaning process may include a step of melt processing a first processing resin, and a step of melt processing the cleaning agent, and optionally a step of melt processing a second processing resin that may be the same as or different from the first processing resin, where the melt processing steps include processing through at least one same portion of the polymer processing equipment, such that the polymer processing equipment (e.g., the at least one same portion of the polymer processing equipment) is at least partially cleaned.

The cleaning agent may be used in a cleaning process that cleans polymer processing equipment, such as equipment that compounds polymeric materials (e.g., a mixture, a single screw extruder, a twin screw extruder, a kneader or a mill), or equipment that shapes or otherwise forms polymeric materials (e.g., an extruder, a mill, an injection molding machine, a blow molding machine, a co-injection molding machine, and the like). Without limitation, the cleaning agent of the present invention may be used to clean polymer processing equipment that shapes a preform, shapes a finished part, shapes a pellet, forms or extrudes a parison, shapes an intermediate structure, shapes a profile, shapes a fiber, provides at least one feedstream into a multi-component object, or any combination thereof. For example, the cleaning may be used to clean one, two or more (e.g., all) of the extruders employed in forming a co-extruded or co-injected molded part, such as a multi-layered film. The cleaning agent may be used for cleaning in a continuous process or a batch process.

The cleaning agent may be used for transition between different materials (e.g., between different processing resins), to clean a processing equipment, to prevent building up of material in a processing equipment, or any combination thereof. For example, the cleaning agent may be used for transitioning between processing resins which are chemically different, or between two different grades of processing resins that are chemically the same. The cleaning agent may be used to clean at least a portion of the processing equipment (e.g., a die, a screw, a barrel, a nozzle, a role, a mixing blade, a tube such as an adapter or other transition tube, or an combination thereof) to remove contamination, to remove degraded material, to remove material adhered to the processing equipment, to remove gelled material, or any combination thereof. The cleaning agent may be used to prevent build-up of material in a processing equipment and thereby prevent the material from degrading, gelling, or otherwise forming a contaminant. The cleaning agent of the present invention may be used for removing a polymer-containing resin (e.g., a first processing resin) that includes, consists substantially of, or even consists entirely of one or more polyamides, one or more polyesters, one or more ethylene vinyl alcohol copolymers, or any combination thereof. The cleaning agent may also be used for removing a polymer containing resin that includes, consists substantially of, or even consists entirely of a polyolefin, such as polyethylene or polypropylene, or a polystyrene. Any other polymers, copolymers or combinations thereof are suitable as well.

In view of the above, various embodiments of the present invention relate to:

ITEM 1. A cleaning agent for cleaning polymer processing equipment, wherein the cleaning agent comprises:
 i) a thermoplastic resin and
 ii) a foaming agent selected from alkali metal and ammonium bicarbonates.

ITEM 2. The cleaning agent according to ITEM 1, wherein the foaming agent is selected from sodium bicarbonate, potassium bicarbonate, sodium sesquicarbonate and potassium sesquicarbonate, preferably sodium bicarbonate.

ITEM 3. The cleaning agent according to ITEM 1 or 2, wherein the thermoplastic resin is selected from polyvinylchlorides, polyamides, polyacrylates, polystyrols, polyethylene terephthalates, polybutylene terephthalates, polymethyl methacrylates, and polyolefins, preferably polyethylene and polypropylene, more preferably high-density polyethylene (HDPE).

ITEM 4. The cleaning agent according to any of the preceding ITEMS, wherein the cleaning agent comprises 0.1 to 40% by weight, preferably 1 to 15% by weight, more preferably more than 5 to 15% by weight of the foaming agent based on the total weight of the cleaning agent.

ITEM 5. The cleaning agent according to any of the preceding ITEMS, wherein the foaming agent is present in the form of particles having an average particle size in the range of 0.1 to 4 mm, preferably in the range of 1 to 4 mm, more preferably in the range of 1.5 to 3.5 mm.

ITEM 6. The cleaning agent according to any of the preceding ITEMS, wherein the foaming agent is present in the form of coated particles, preferably wherein the coating is selected from alkali metal carbonates, fatty acids, fatty acid salts and any combination thereof.

ITEM 7. The cleaning agent according to any of the preceding ITEMS, wherein the cleaning agent is a mixture comprising particles of thermoplastic resin and particles of foaming agent.

ITEM 8. The cleaning agent according to ITEM 7, wherein the cleaning agent is a mixture of sodium bicarbonate granules having an average particle size in the range of 1.5 to 3.5 mm and HDPE granules.

ITEM 9. The cleaning agent according to any of ITEMS 1 to 6, wherein the cleaning agent is in the form of particles comprising the thermoplastic resin and the foaming agent.

ITEM 10. The cleaning agent according to any of the preceding ITEMS, wherein the cleaning agent further comprises one or more additives selected from binding agents that bind together the foaming agent with the thermoplastic resin, stabilizers, processing aids, anti-blocking agents, antistatic agents, antioxidants, lubricants, pigments, surfactants, plasticizers, and any combination thereof.

ITEM 11. The cleaning agent according to ITEM 10, wherein the binding agent is selected from amide wax, maleated ethylene wax, maleated propylene wax, microcrystalline wax, oxidized wax, paraffin wax, petroleum wax, polyethylene wax, such as LDPE, PTFE wax, wax ester, wax soap, such as stearate salts, in particular calcium or magnesium stearate, polycaprolactone wax, glycol wax, or any combination thereof.

ITEM 12. The cleaning agent according to any of the preceding claims, wherein the cleaning agent does not contain any abrasive agent or chain scission catalyst.

ITEM 13. A method for producing the cleaning agent of ITEMS 1 to 12, which comprises the steps of
 a) mixing particles of the thermoplastic resin with particles of the foaming agent; or
 b) compounding the thermoplastic resin with the foaming agent to obtain particles comprising the thermoplastic resin and the foaming agent.

ITEM 14. The method according to ITEM 13, wherein in step b) the compounding is conducted by hot or cold compression molding, such as melt extrusion.

ITEM 15. Use of the cleaning agent of ITEMS 1 to 12 for cleaning polymer processing equipment or any component thereof.

EXAMPLES

The present invention will hereinafter be explained in more detail with reference to the following non-limitative working examples and comparative examples.

Example 1

IXEF® Para black grade pellets were used in confirming the cleaning effect of cleaning agents according to the invention and not according to the invention. As cleaning agents, white HDPE granules (not according to the invention) and mixtures comprising 95% by weight of white HDPE granules and 5% by weight of compacted Bicar® TEC 0/4 AD (2-3 mm size; sodium bicarbonate) (according to the invention) or 85% by weight of white HDPE granules and 15% by weight of compacted Bicar® TEC 0/4 AD (according to the invention) were employed. The test for cleaning effect of the cleaning agents was performed in the following manner.

The black-colored pellets were subjected to melt extrusion using a Coperion twin-screw 58 mm SC at a rotation speed of 350 rpm and at a feeding rate of about 10 1/10 min. After 10 kg of the black-colored pellets were charged, 10 kg of the cleaning agent were charged.

The cleaning efficacy was evaluated by visual observation of the remaining grey color in the extruded polymer after 10 kg of the cleaning agent were charged.

It was observed that 10 kg of HDPE are not enough to purge the IXEF® resin. The mixture of HDPE and 5% by weight of Bicar® was 50% more efficient that HDPE alone. The mixture of HDPE and 15% by weight of Bicar® was 70% more efficient that HDPE alone.

Example 2

In this example, a mixture of 98% by weight of polyethylene PE B6922 and 2% by weight of a blue pigment (BLUE CROMOPHTAL®) was used in confirming the cleaning effect of cleaning agents according to the invention and not according to the invention. As cleaning agents, white polyethylene PE B6922 granules (not according to the invention) and mixtures comprising 98% by weight of white polyethylene PE B6922 granules and 2% by weight of sodium bicarbonate TEC pellets (according to the invention) or 90% by weight of white polyethylene PE B6922 granules and 10% by weight of sodium bicarbonate TEC pellets (according to the invention) were employed. The test for cleaning effect of the cleaning agents was performed in the following manner.

The mixture of PE B6922 and the blue pigment was extruded for 30 minutes through a Collin 20 mono-screw extruder having a screw diameter of 20 mm and a length of 25 D. After 30 minutes, the fed was switched to the cleaning agent and the cleaning efficacy was evaluated by visual observation of the remaining blue color in the extruded polymer.

It was observed that even after 60 minutes extrusion of white PE B6922, the extruded polymer was still blue. It was estimated that several hours of cleaning would be required for removing the blue pigment from the equipment.

Using the mixtures of PE B6922 with the sodium bicarbonate pellets as cleaning agent instead of the white PE B6922 granules under the same conditions significantly increased the cleaning efficacy. With the mixture containing 2% by weight of the sodium bicarbonate, the blue pigment was removed from the processing equipment to a large extent after 30 minutes. By using the mixture containing 10% by weight of the bicarbonate, the blue pigment was removed from the processing equipment to a large extent even after 15 minutes.

The invention claimed is:

1. A cleaning agent for cleaning polymer processing equipment, wherein the cleaning agent comprises
   i) a thermoplastic resin and
   ii) a foaming agent selected from alkali metal and ammonium bicarbonates, and wherein the cleaning agent does not contain any abrasive agent or chain scission catalyst.

2. The cleaning agent according to claim 1, wherein the foaming agent is selected from the group consisting of sodium bicarbonate, potassium bicarbonate, sodium sesquicarbonate and potassium sesquicarbonate.

3. The cleaning agent according to claim 1, wherein the thermoplastic resin is selected from the group consisting of polyvinylchlorides, polyamides, polyacrylates, polystyrols, polyethylene terephthalates, polybutylene terephthalates, polymethyl methacrylates, and polyolefins.

4. The cleaning agent according to claim 1, wherein the cleaning agent comprises 0.1 to 40% by weight of the foaming agent based on the total weight of the cleaning agent.

5. The cleaning agent according to claim 1, wherein the foaming agent is present in the form of particles having an average particle size in the range of 0.1 to 4 mm.

6. The cleaning agent according to claim 1, wherein the foaming agent is present in the form of coated particles.

7. The cleaning agent according to claim 6, wherein the coated particles have a coating selected from the group consisting of alkali metal carbonates, fatty acids, fatty acid salts and any combination thereof.

8. The cleaning agent according to claim 1, wherein the cleaning agent is a mixture comprising particles of thermoplastic resin and particles of foaming agent.

9. The cleaning agent according to claim 8, wherein the cleaning agent is a mixture of sodium bicarbonate granules having an average particle size in the range of 1.5 to 3.5 mm and HDPE granules.

10. The cleaning agent according to claim 1, wherein the cleaning agent is in the form of particles comprising the thermoplastic resin and the foaming agent.

11. The cleaning agent according to claim 1, wherein the cleaning agent further comprises one or more additives selected from the group consisting of binding agents that bind together the foaming agent with the thermoplastic resin, stabilizers, processing aids, anti-blocking agents, antistatic agents, antioxidants, lubricants, pigments, surfactants, plasticizers, and any combination thereof.

12. The cleaning agent according to claim 11, wherein the binding agent is selected from the group consisting of amide wax, maleated ethylene wax, maleated propylene wax, microcrystalline wax, oxidized wax, paraffin wax, petroleum wax, and polyethylene wax.

13. A method for producing the cleaning agent of claim 1, which comprises the steps of
   a) mixing particles of the thermoplastic resin with particles of the foaming agent; or
   b) compounding the thermoplastic resin with the foaming agent to obtain particles comprising the thermoplastic resin and the foaming agent.

14. The method according to claim 13, wherein in step b) the compounding is conducted by hot or cold compression molding.

15. A method for cleaning polymer processing equipment or any component thereof, comprising using the cleaning agent of claim 1.

* * * * *